Feb. 16, 1926.

W. J. KNOLL 1,573,554

BEVELING MACHINE

Filed Sept. 13, 1924      4 Sheets-Sheet 1

Inventor
William J. Knoll

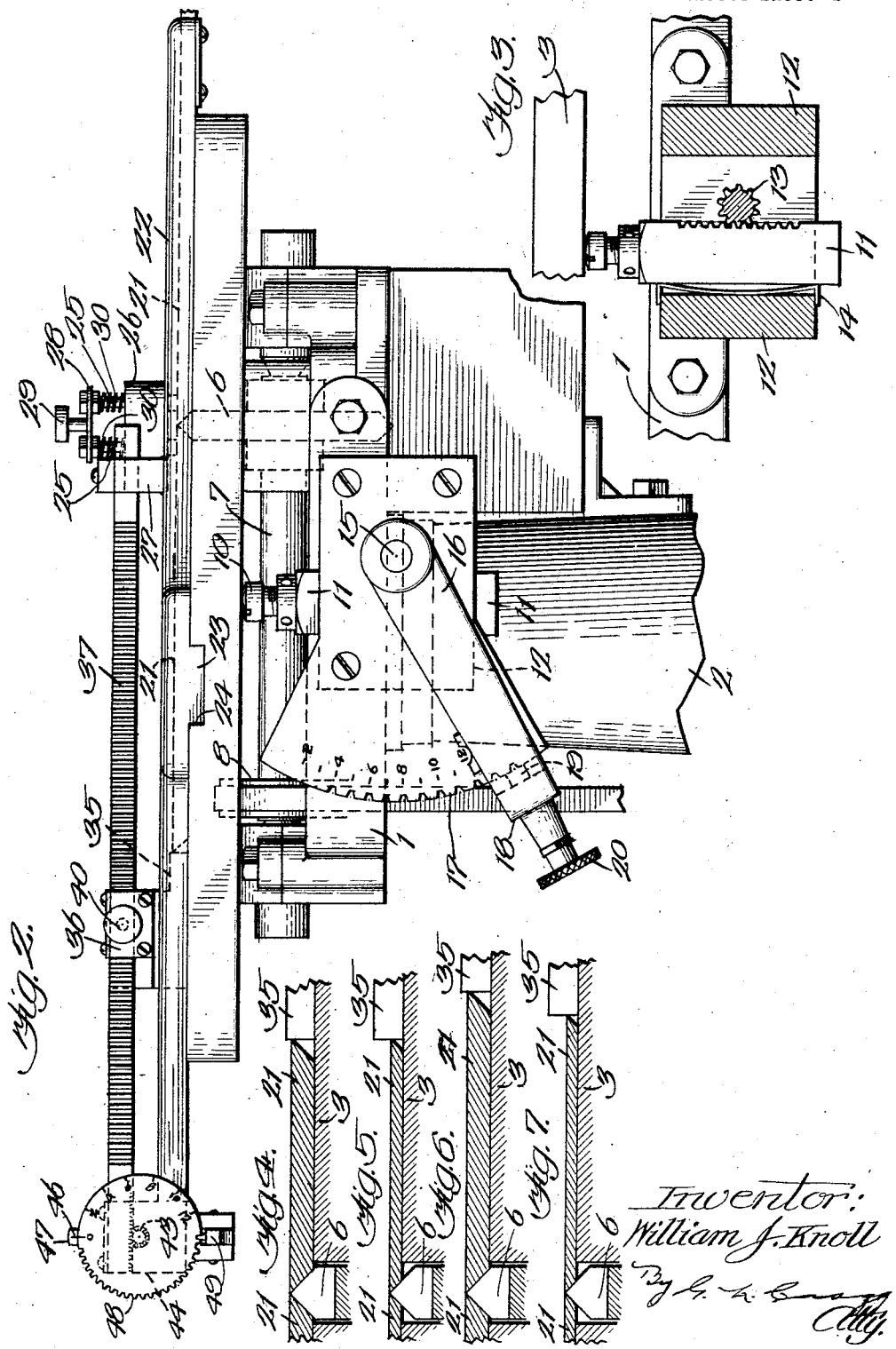

Feb. 16, 1926.  
W. J. KNOLL  
BEVELING MACHINE  
Filed Sept. 13, 1924

Inventor:  
William J. Knoll

Feb. 16, 1926.  
W. J. KNOLL  
BEVELING MACHINE  
Filed Sept. 13, 1924   4 Sheets-Sheet 4
1,573,554
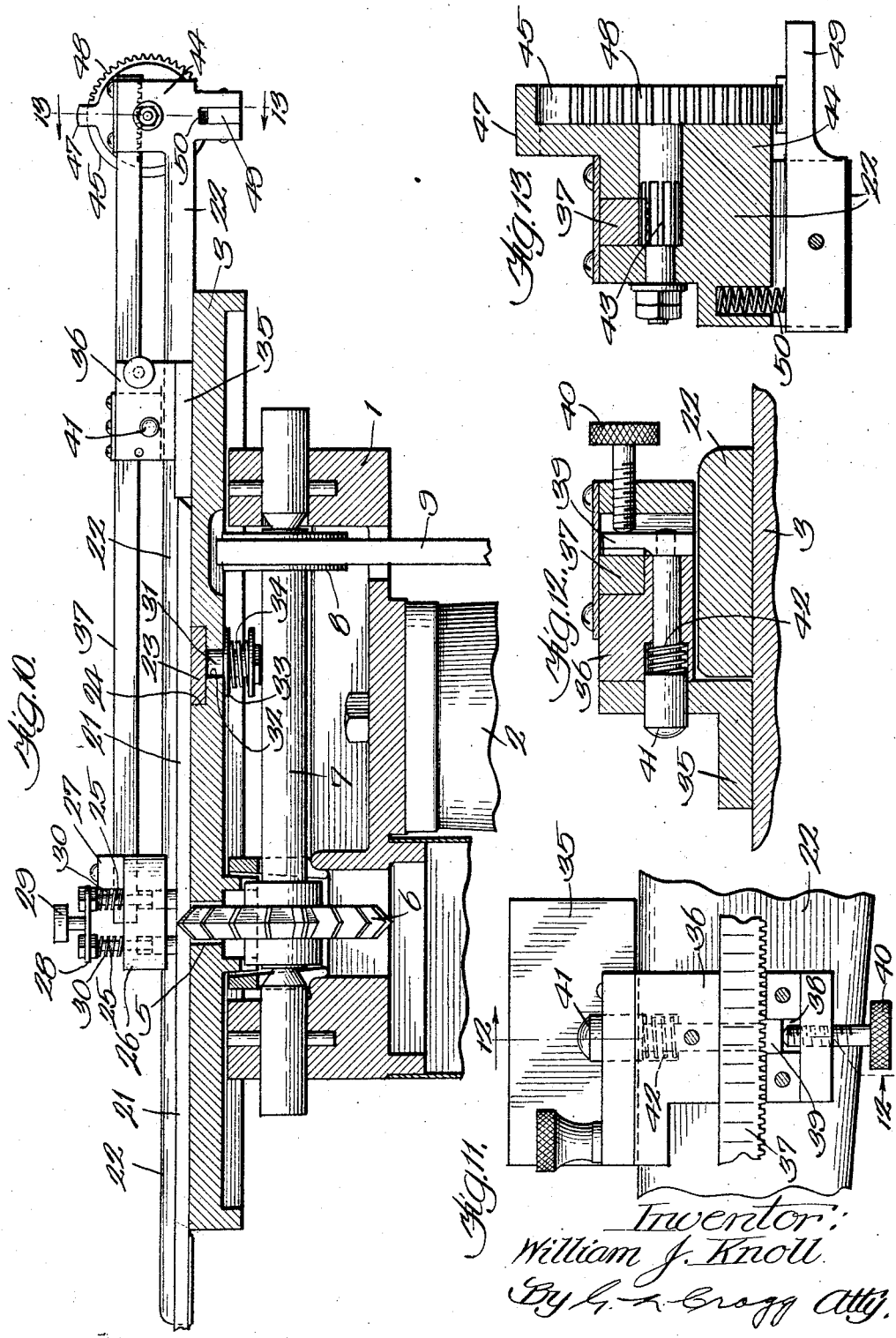
Inventor:
William J. Knoll
By G. L. Gregg Atty.

Patented Feb. 16, 1926.

1,573,554

UNITED STATES PATENT OFFICE.

WILLIAM J. KNOLL, OF CHICAGO, ILLINOIS, ASSIGNOR TO H. B. ROUSE & COMPANY, OF CHICAGO, ILLINOIS, A CORPORATION OF ILLINOIS.

BEVELING MACHINE.

Application filed September 13, 1924. Serial No. 737,507.

*To all whom it may concern:*

Be it known that I, WILLIAM J. KNOLL, a citizen of the United States, residing at Chicago, in the county of Cook and the State of Illinois, have invented a certain new and useful Improvement in Beveling Machines, of which the following is a full, clear, concise, and exact description.

My invention relates to machines for cutting and beveling strips of sheet material and is of particular advantage in cutting printers' rules to length and beveling the ends thereof.

The machine of my invention includes a cutter and gauging device whereby the lengths of the rules or other strips may be determined between the overhanging bevel edges or between the overhung bevel edges. In the preferred embodiment of the invention, gauging means are employed that measure the length of the strips between the overhanging bevel edges and supplemental gauging means are employed to modify the adjustment of the first gauging means to effect an adjustment corresponding to the distance between the overhung bevel edges of the strips to be formed. The cutter employed is in the form of a cutting wheel whose crown is in its median plane and whose periphery has symmetrically related beveled cutting faces on opposite sides of the crown. Means are employed for adjusting the cutter with respect to the work support whereby strips of different thicknesses may be cut in a manner to have the crown reach and just penetrate the strips being cut, whereby the strips will be cut to the length defined by the adjustment of the gauges without necessitating any readjustment of the gauges when strips of differing thickness are being cut.

Figure 1:
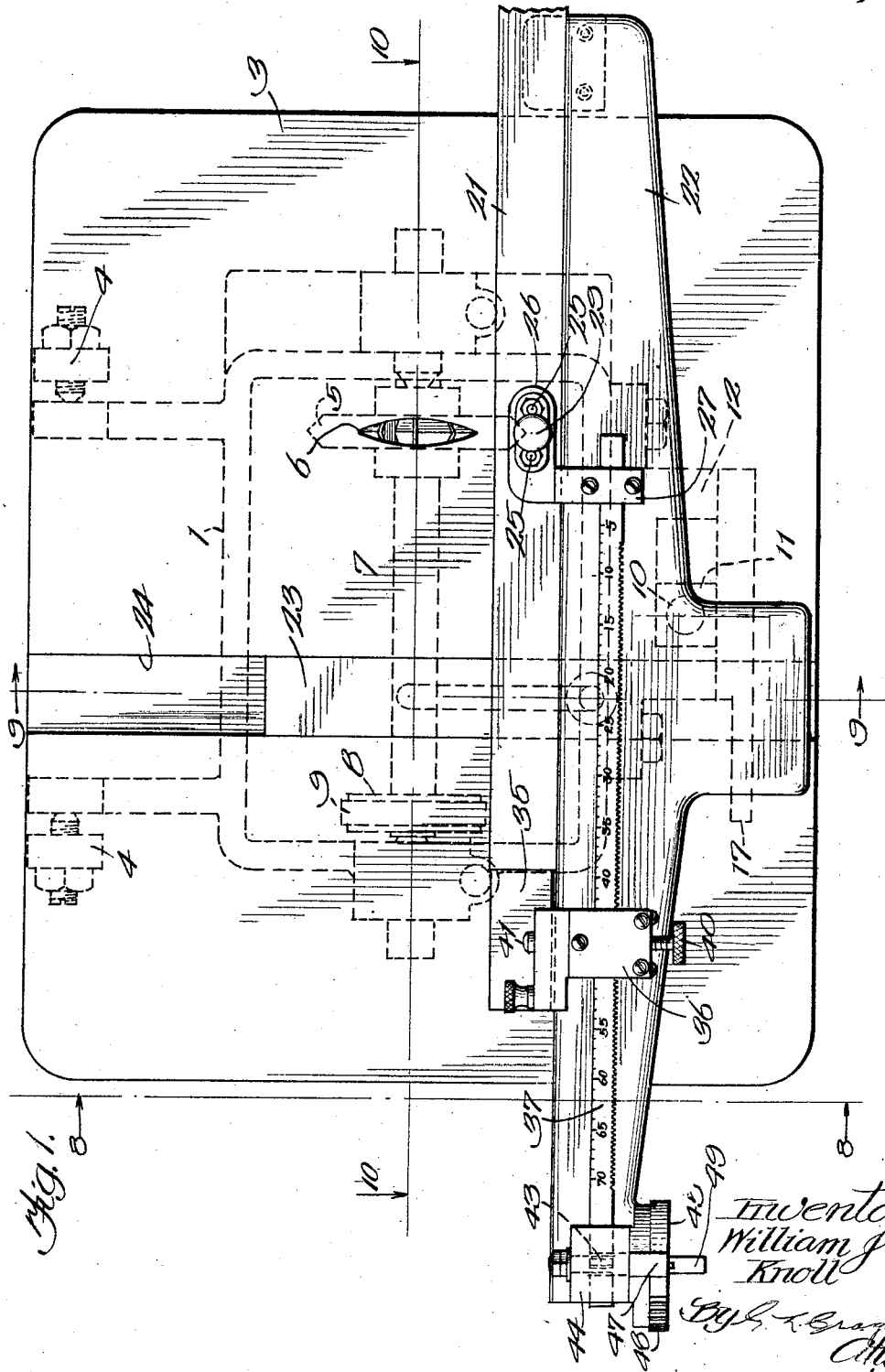
Figure 8:
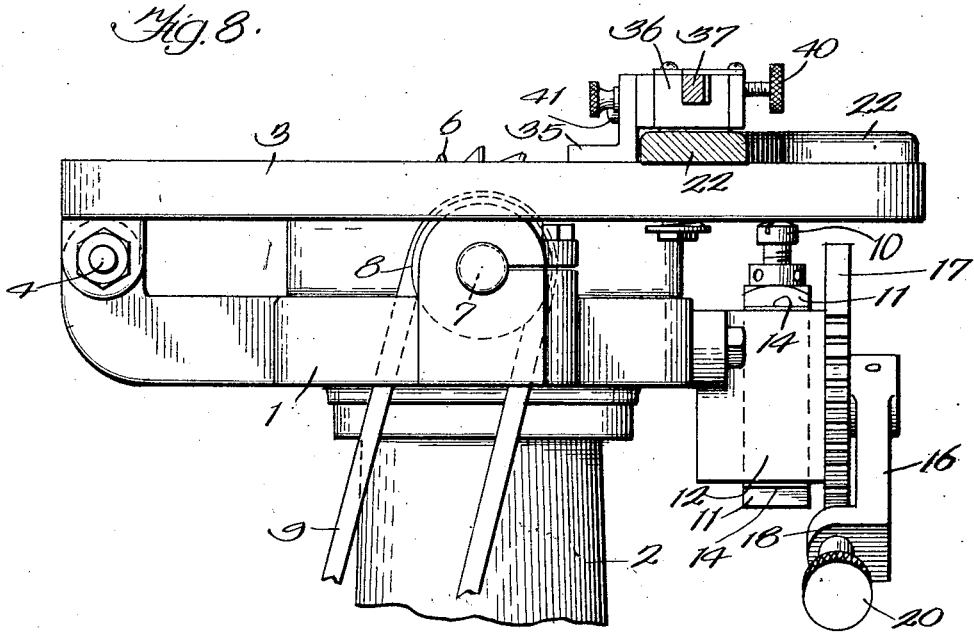
Figure 9:
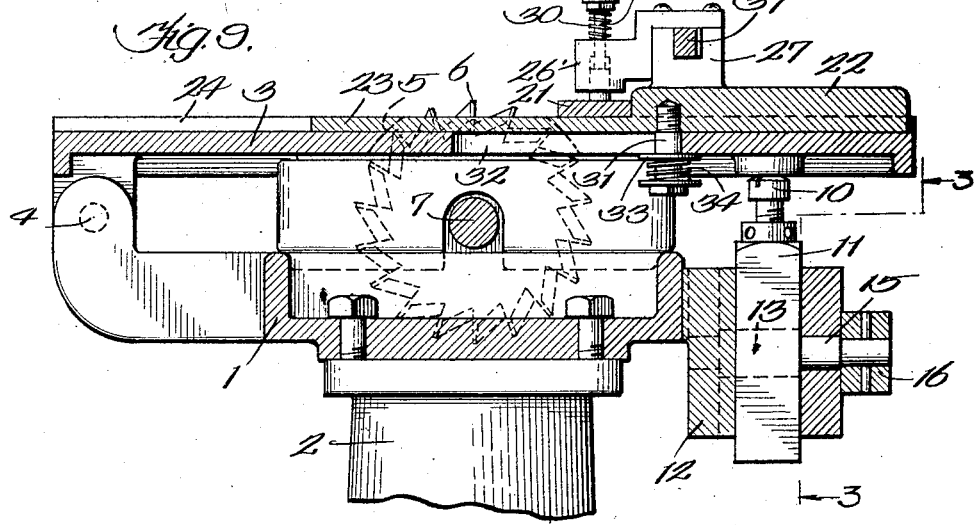

The invention will be more fully explained in connection with the accompanying drawings in which Fig. 1 is a plan view of the preferred embodiment thereof, a portion being broken away; Fig. 2 is a front view of the upper portion of the machine showing mechanism of the invention; Fig. 3 is a sectional view on line 3—3 of Fig. 9; Figs. 4, 5, 6 and 7 are views, somewhat diagrammatic, illustrating the manner in which the machine is adjusted; Fig. 8 is a sectional view on line 8—8 of Fig. 1; Fig. 9 is a sectional view on line 9—9 of Fig. 1; Fig. 10 is a sectional view on line 10—10 of Fig. 1; Fig. 11 is a view on a larger scale of part of mechanism as it appears in Fig. 1 with a covering plate removed; Fig. 12 is a sectional view on line 12—12 of Fig. 11; Fig. 13 is a sectional view on line 13—13 of Fig. 10.

The bed 1 is suitably supported, as upon a standard 2. The work table 3 is pivoted along its rear edge to the bed as indicated at 4. The work table is formed with a transverse opening 5 therethrough through which the milling tool or cutter 6 is projected to an extent corresponding to the depth of the cut to be made. This cutter is in the form of a wheel fixed upon a shaft 7. A pulley 8 is fixed upon the shaft and is driven by a belt 9. The extent to which the cover wheel 6 projects above the table 3 is determined by means of a vertically adjustable post 10 which engages the bottom of the table 3 on the side thereof opposite its hinge 4. The post is screw threaded into a rack bar vertically movable through the interior of a hollow block 12 which is fastened to the bed 1. A horizontal pinion 13 is located within the interior of the block 12 and engages the rack 11 which is maintained in connection with the pinion by means of a leaf spring 14 interposed between the rack at one side of the block. The pinion is carried upon a shaft 15 which is journaled in the sides of the block 12 and which carries a handle 16 upon its outer end whereby the pinion may be turned to elevate or lower the table. A notched sector 17 is screwed upon the block 12 and the handle carries a lateral extension 18 through which inwardly spring pressed pin 19 passes to engage a selected notch in the sector to hold the pinion 13 in any selected adjustment to hold the selected adjustment of the table. This pin may carry a knurled head 20 which may be pulled upon when the pin is to be released for engagement with another selected notch. The object to be cut is illustrated in the form of a printer's rule 21, although the invention is not to be limited to any particular work to be performed. This rule is placed against the head 22 of a carriage having a transvers horizontal extension 23 which is received within a transverse groove 24 formed in the table. The work is held upon the carriage by means of the pins 25 which are carried upon and passed through a bracket 26, which, in turn, is mounted upon the post 27 projecting upwardly from the head 22. These pins 25 depend from a cross head 28 having a thumb button 29 by which the pins may be pressed upon the work to hold it while being cut. When thumb pressure is released from the button, the springs 30 raise the pins from the work to permit of its removal and adjustment. The range of travel of the carriage is determined by pin 31 which passes downwardly through a transverse slot 32 in the table, the ends of the slot defining the limits of the travel of the carriage. The pin may be surrounded by a washer 33 engaging the under-surface of the table. A spring 34 presses the washer against the table to hold the carriage in assembly with the table.

The lengths into which the printer's rule 21 or other work may be cut is adjustably determined by means of the adjustable gauge stop 35 which is located in front of the work engaging upright face of the carriage head 22. The gauge stop 35 is carried upon a cross head 36 which is slidably supported upon a rack bar 37, this rack bar being normally stationary upon the carriage head 22. The cross head 36 has a transverse slot 38 therein which receives a toothed block 39 adapted to mesh with the teeth of the rack 37. A set screw 40 holds the toothed block in its selected relation to the rack bar, this pin being threaded within the cross head. The lengths, over all, into which the rules or other work are cut, is defined by the distance between the gauge stop 35 and the cutting crown of the wheel 5 which, in the body of the invention illustrated, forms mitre or beveling cuts in the work. After each length of rule is cut and removed, the rule stock is fed until its end engages the stop 35 whereupon the cutting operation is repeated. If it is desired to change the lengths, over all, of the rules cut from the rule stock, the toothed block 39 must be shifted along the rack bar 37 to the required extent. To this end, the set screw 40 is withdrawn from the block whereafter the horizontal push button 41, which is connected with the block 39 and is slidable in the cross head, is pushed inwardly against the force of the restoring spring 42 to clear the toothed block from the rack, whereupon the cross head 36 is moved along the rack to the desired extent whereafter the push button is released to permit the spring 42 to bring the toothed block into engagement with the fresh rack teeth, to hold the cross head and the gauge stop thereon in new adjustment. After such adjustment has been effected it is again maintained by again tightening the set screw 40 against the toothed block 39. The rack bar 37 may bear scale marks thereon, as indicated in Fig. 1, to aid in determining the lengths of the rules or other parts which are to be cut. When printers' rules are to be cut by the machines, the scale divisions upon the rack bar are in picas. As illustrated in Fig. 1, the gauge stop 35 is adjusted to enable rules of forty-three picas length, over all, to be cut. In beveling the ends of rules or other strips, the wheel 6 has its crown in the medium plane of the wheel, the wheel being symmetrically beveled upon each side of its crown, and the adjustment is such that this crown penetrates to and through the top surface of the rule's top, the result being that the strip is cut in two severed beveled ends on either side of the cutting wheel. After a rule length has been cut, the carriage is withdrawn from the cutter, the cut length of the rules removed and the strip is again advanced against the carriage stop 35, whereupon the cutting operation is repeated. If a strip of another thickness is to be cut, the table is elevated or lowered until the crown of the cutter just penerates the strip, see Figs. 4 and 5. The length of the strip, in accordance with the illustrations in Figs. 4 and 5, is defined by the distance between the extreme or overhanging edges of the bevel. If the lengths of the strips are to be measured between the inner or overhung edges of the bevels, the gauge 35 is set, with reference to the rack bar 37, at a position corresponding to the designated length of the strips to be cut, the error in this positioning of the gauge stop 35 being corrected by shifting the rack bar 37 a distance which is twice the distance of the base of bevel angle, the rack bar being mounted to slide in the cross head 36. Inasmuch as this adjustment of the rack bar must be in accordance with the thickness of the strip, the side of the table is adjusted by the elevation or depression of the post 10, in the manner hereto described, whereafter, the rack bar being adjusted as stated to aid the operator, the notches in the sector 17 are numbered and the adjusting device for the rack bar has scale divisions correspondingly numbered. This adjusting device is preferably inclusive of a pinion 43 which is journaled to rotate in an enlargement 44 of the carriage 22. The shaft of this pinion carries an adjusting head 45 by which the pinion may be turned to shift the rack bar 37 to the desired extent. This adjusting head is provided with scale divisions, as indicated, which correspond with the scale divisions upon the sector 17, the scale divisions numbered corresponding to the number of the selected notch in the sector 17, being placed at the stationary index line 46 marked upon the post 47 that is stationary with respect to the carriage head 22. The adjusting head 45 may be formed with a number of peripheral teeth 48 to be engaged by a holding dog 49 to maintain the adjustment effected by the pinion 43. This holding dog is pivotally mounted upon the carriage 22 and is spring pressed by a coiled spring 50 which presses downwardly upon the tail of the dog to move the nose of the dog into the selected toothed notch upon the adjusting head 45. The adjustment for variation in thickness of the strip in conjunction with determining the length between the inner or overhung bevel edges is diagrammatically illustrated in Figs. 6 and 7. It is understood that when the lengths of the strip being cut are measured between the overhanging edges of the bevels, that the zero scale division mark upon the adjusting head 45 is pressed in register with the stationary index mark 46, placing the rack in the normal relation with the cutter wheel which is required when the lengths of the strip are being measured between the overhanging edges of the bevels, it being understood that the graduations of the rack read from the crown plane of the cutter wheel toward the gauge stop 35.

Changes may be made without departing from my invention.

Having thus described my invention, I claim:—

1. A beveling cutter; a work support for positioning the material, this support and cutter being relatively movable to enable the cutter to cut the work upon the support; a gauge for determining the over all length of the portions cut and beveled; and a supplemental gauge for modifying the adjustment of the first gauge to measure the length between the overhung bevel edges of the portions being cut and beveled.

2. A beveling cutter; a work support for positioning the material, this support and cutter being relatively movable to enable the cutter to cut the work upon the support; a gauge for determining the over all length of the portions cut and beveled; a supplemental gauge for modifying the adjustment of the first gauge to measure the length between the overhung bevel edges of the portions being cut and beveled; and means for adjusting the distance between the crown of the cutter and the work receiving face of the work support.

3. A beveling cutter in the form of a wheel having symmetrically related beveling faces sloping from the crown thereof; a work support for positioning the material, this support and cutter being relatively movable to enable the cutter to cut the work upon the support; a gauge for determining the over all length of the portions cut and beveled; and a supplemental gauge for modifying the adjustment of the first gauge to measure the length between the overhung bevel edges of the portions being cut and beveled.

4. A beveling cutter in the form of a wheel having symmetrically related beveling faces sloping from the crown thereof; a work support for positioning the material, this support and cutter being relatively movable to enable the cutter to cut the work upon the support; a gauge for determining the over all length of the portions cut and beveled; a supplemental gauge for modifying the adjustment of the first gauge to measure the length between the overhung bevel edges of the portions being cut and beveled; and means for adjusting the distance between the crown of the cutter and the work receiving face of the work support.

5. A beveling cutter; a work support for positioning the material, this support and cutter being relatively movable to enable the cutter to cut the work upon the support; a gauge for determining the over all length of the portions cut and beveled inclusive of an adjustable gauge stop and a measuring bar along which the stop is movable; and a supplemental gauge for moving the measuring bar longitudinally in measuring the length between the overhung bevel edges of the portions being cut and beveled.

In witness whereof, I hereunto subscribe my name.

WILLIAM J. KNOLL.